Patented July 8, 1941

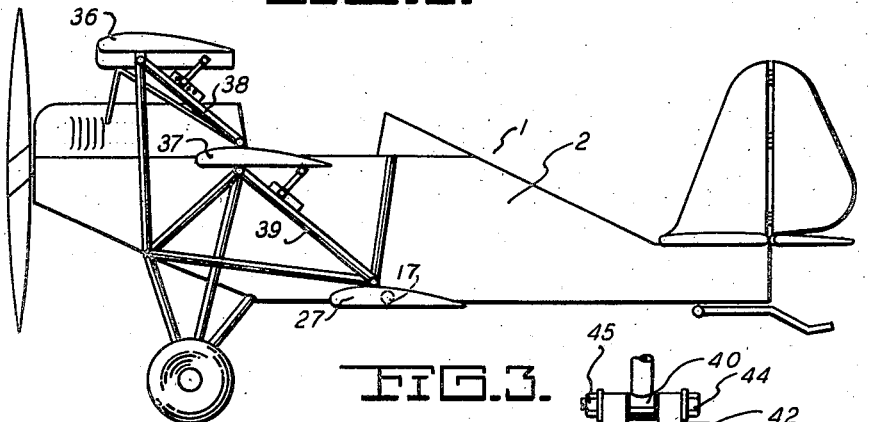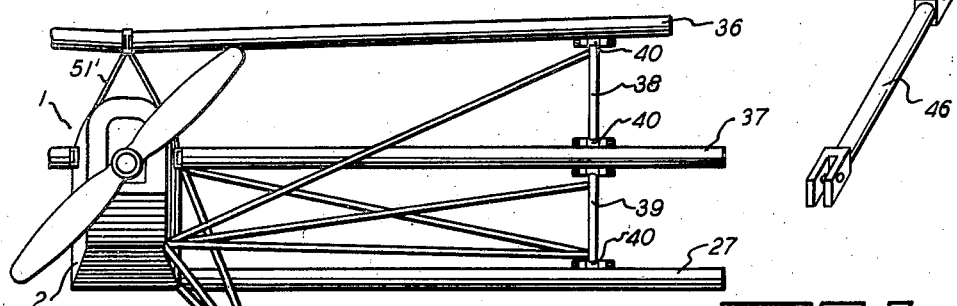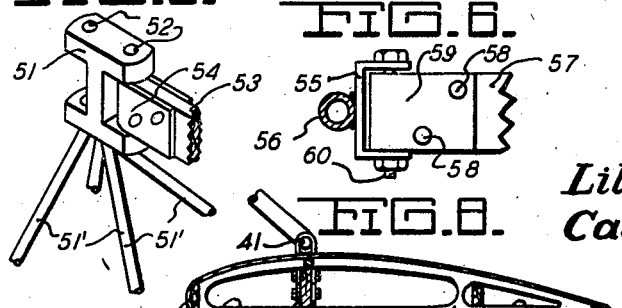

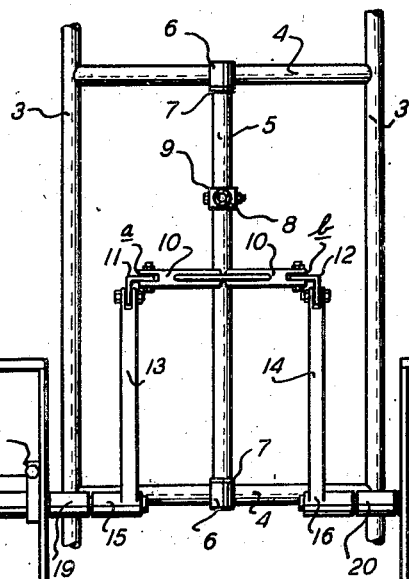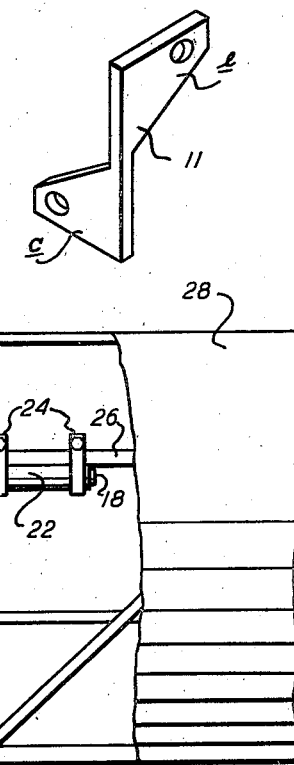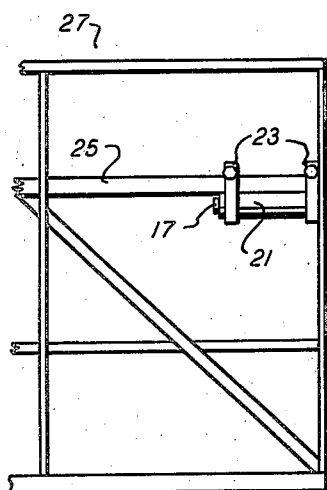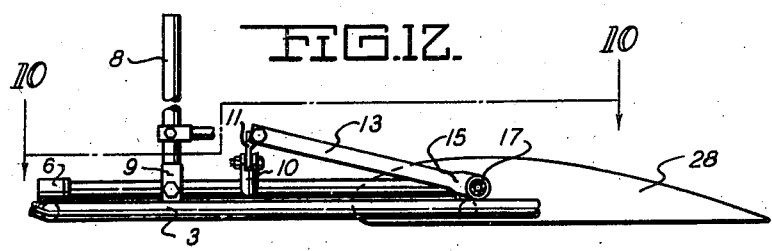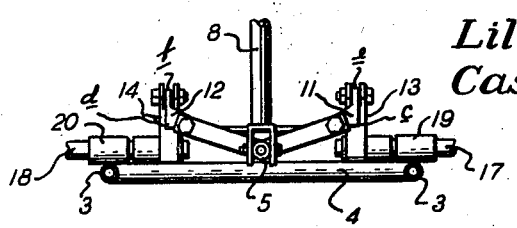

2,248,235

UNITED STATES PATENT OFFICE 2,248,235

AIRPLANE CONSTRUCTION

Lillian Holden and Cassell De Hibbs, Fort Worth, Tex., assignors of one-third to McKinney G. Davis, Fort Worth, Tex.

Application April 18, 1938, Serial No. 202,644

2 Claims. (Cl. 244—83)

This invention relates to airplanes and has particular reference to airplanes of light construction. The primary object of the invention resides in the provision of a wing construction in which the lateral control of the device is simplified in its construction.

Another object of the invention is in a wing construction which eliminates the use of ailerons for controlling the plane by pivotally supporting and controlling the lower wings.

Another object of the invention resides in a novel system of controls whereby opposingly arranged wings may be operated in unison, though conversely, for effecting the lateral control of the plane, such as necessary in banks and turns.

A still further object of the invention resides in the provision of means whereby the angle of incidence may be adjusted to meet the requirements of the lift necessary for maintaining flight according to the load placed upon the plane.

And yet another object of the invention resides in the provision of pivotal connections between struts and the wings in order that certain of the wings may act as ailerons and other of the wings may be adjusted as to angle of incidence.

Broadly, the invention seeks to comprehend the provision of an airplane construction wherein the lateral controls of the airplane are simplified and in which the ailerons are eliminated by pivotally operating the lower wings of the device.

Other objects of the invention will become manifest as the description proceeds taken in connection with the accompanying drawings wherein:

Figure 1 is a side elevational view of the invention particularly illustrating the relative positions of the multiple wings, the arrangement of the struts and diagonals, the stagger of the wings, and the positions of the incidence adjustment struts attached to the wing struts.

Figure 2 is a fragmentary front elevational view likewise illustrating the relative positions of the struts and diagonals.

Figure 3 is a fragmentary front elevational view illustrating the attachment of a strut to a portion of a main wing spar.

Figure 4 is a perspective view of one of the incidence struts.

Figure 5 is a fragmentary perspective view of the upper wing mounting which is positioned above the cowling and showing a fragmentary portion of a main spar pivotally attached thereto.

Figure 6 is a fragmentary view of the inner end of a main spar of the center wing illustrating the attachment thereof to an upper longeron, the latter being shown in section.

Figure 7 is an end view of the upper wing particularly illustrating the attachment of the incidence strut to a false spar.

Figure 8 is a sectional view of one of the wings illustrating the arrangement and design of the ribs as well as the construction of the spars, the leading edge, and the trailing edge.

Figure 9 is an end sectional view of a main spar illustrating the attachment of a tubular control axle attached thereto and showing the manner of securing these parts by use of a bracket bolted and welded around the same.

Figure 10 is a fragmentary plan view of the lateral control system illustrating fragments of the wings attached thereto and is taken on lines 10—10 of Figure 12.

Figure 11 is a perspective view of one of the control links used between the control arms and the wing levers.

Figure 12 is a fragmentary elevational view of the control illustrated in Figure 10, and Figure 13 is a front fragmentary elevational view of the lateral control mechanism.

Continuing with a more detailed description of the drawings, the numeral 1 generally designates the airplane, the fuselage 2 of which is constructed with lower longerons 3 which are spaced by cross members 4.

Between pairs of the cross members 4 and longitudinally arranged with respect to the length of the fuselage 2 there is mounted a longitudinal axle 5, preferably of steel tubing, and is rotatably supported at each end by bushings 6 which are welded to the cross members 4. The longitudinal axle 5 is retained within the bushings 6 by reason of flanges 7 welded to the said axle as particularly illustrated in Figures 10 and 12.

To attain the rotatable movement of the longitudinal axle 5 a conventional joy stick 8 is attached thereto by a pivoted yoke 9 as illustrated in Figures 10, 12 and 13.

Opposingly arranged control arms 10 extend outwardly from the axle 5, as illustrated in Figures 10, 12 and 13, and the outer ends of which are slotted at a and b to receive the ends c and d of the connecting links 11 and 12, particularly illustrated in Figure 11. The upper ends e and f of the connecting links 11 and 12 extend at right angles with respect to the lower ends c and d and are designed to engage the forward ends of levers 13 and 14.

The connections between the links 11 and 12 and the arms 10 and the levers 13 and 14 are such as to permit a certain amount of movement and thus provide a limited toggle arrangement whereby, when the joystick 8 is moved laterally the arms 13 and 14 may be operated and have imparted thereto sufficient movement to obtain the required results in changing the attack of the wings 27 and 28. The slots *a* and *b* of the arms 10 engaging the lower ends *c* and *d* of the links 11 and 12 are of such width as to permit sufficient movement between these members for operation; likewise, the slots provided in the ends of the levers 13 and 14 connected to the upper ends *e* and *f* of the connecting links 11 and 12 will permit vertical movement of these levers.

The opposing ends of the levers 13 and 14 terminate in integral bosses or sleeves 15 and 16 which, in turn, rigidly secure laterally extending tubing 17 and 18 and are supported at the points where they cross the longérons 3 by bearings 19 and 20 which are welded to the said longerons.

The outer ends of the tubing 17 and 18 are rigidly engaged by sleeves 21 and 22 and have pairs of brackets 23 and 24 welded thereto. These brackets are of such design as to engage the main spars 25 and 26 of the lower wings 27 and 28 of the airplane, the last engagement being made by bolts 29 passing through the outer portion of the said brackets and enclosing the said spars in the manner illustrated in Figure 9.

Thus, when the joy stick 8 is moved to either side, the effect upon the wings 27 and 28 is that they assume converse angles of attack since one of the arms 10 is moved upwardly whereas the opposing arm is moved downwardly having an opposing effect upon each of the levers 13 and 14. Obviously, the tubular supports 17 and 18 are rotated in opposite directions, in turn, conveying the movement to each of the wings 27 and 28.

In carrying out the wing construction, the ribs 30 are constructed of single integral pieces of material such as plywood and assume in outline the conventional airflow wing.

Leading edges 31 are attached to the forward portions of the ribs 30, and a trailing edge of crimped metal 32 is laterally attached to the rearward portions of the said ribs, as illustrated in Figure 8. The spars 25 or 26 extend through longitudinal openings 33 each of which is substantially oblong in shape and is designed to render each of the ribs 30 light in weight. False spars 34 likewise extend laterally through the other openings 35 in the ribs 30 and are secured therein for lending strength to the wing construction.

The outer ends of the upper, intermediate, and lower wings 36, 37 and 27 or 28 are pivotally attached to supporting struts 38 and 39, each of which has at its ends lateral bosses 40 and eyelets 41 extending therethrough. On each side of the bosses 40 U-shaped straps 42 are bolted to the main spars, such as 25 and 26, and it is preferred that they be of different lengths, as illustrated in Figure 3, in order that the bolts 43 which secure them in place may be mounted near the upper and lower edges of the said main spars for strength. The bosses 40 of the struts 38 and 39 are pivotally attached therebetween by other bolts 44 and nuts 45.

Directly behind each of the attachments of the spars 38 and 39, and to the false spars 34, there are positioned incidence adjustment struts 46 under the upper wings 36 and 37. Small brackets 47 extend downwardly from the false spars 34, as illustrated in Figure 7, and are pivotally connected to the upper ends of the incidence struts 46, whereas the lower ends of the said incidence struts are designed to slottedly engage rectangular plates 48 which are attached to the trailing edges of the struts 38 and 39. A series of apertures 49 are positioned through the plate 48 whereby an adjustment bolt 50 passing through the lower end of the incidence strut 46 may determine the angle of attack. Obviously, if the engagement is made with the lowermost aperture the angle of attack is greater than when the engagement is with an upper aperture.

Since only a slight degree of change in the incidence of wings 36 and 37 is necessary, it is obvious that a sufficient adjustment can be attained through the medium of the auxiliary or incidence struts 46, previously described, by changing the position of the lower ends thereof along the apertured plate 48 in the manner just described. The flexibility of the wings 36 and 37 will permit a sufficient change in the incidence thereof by warping from the point where the latter are rigidly secured at 44 to the spars 38 and 39 rearwardly to the trailing edge. Thus, by reason of the arrangement 46, 48, 49 and 50, the wings 36 and 37 may be adjusted by warping or twisting to the desired incidence irrespective of the fact that a rigid connection is made between the wings 36 and 37 through the brackets illustrated in Figures 5 and 6.

The upper wing 36, which is preferably constructed in two equal parts, is secured at its center by means of a substantially I-shaped mounting 51 which is supported above and is attached to the fuselage 2 by standards 51', as illustrated in Figure 5 and has vertical openings 52 through each of its laterally extending portions. Thus a pair of brackets are effected for hingedly securing the upper main spars 53 by means of bolts (not shown) which may extend through the U-shaped straps or clevises 54 enclosing the inner ends of the said spars.

The center wings 37 are attached in a like manner to C-shaped brackets 55 secured to the upper longerons 56 of the fuselage 2, the spars 57 having bolts 58 which secure similar clevises 59, and the latter are mounted in the said brackets by bolts 60.

Manifestly, the structure herein shown and described is capable of considerable changes and modifications from time to time by those skilled in the art and such changes and modifications as may be resorted to falling within the spirit and intent of the invention may also be considered as falling within the scope of the appended claims.

What is claimed is:

1. In a control mechanism for airplanes having a fuselage and a pair of wings adapted to pivot and function as ailerons and extending from each side of the said fuselage and having shafts forming pivotal connections therewith; a pair of levers rigidly connected to the said shafts and extending substantially at right angles thereto, a joy stick mounted on an axle substantially parallel to the plane of motion of the said levers, control arms fixed to the said axle and extending to adjacent the ends of the said levers, angle links having one leg loosely pivotally connected to each of the said levers by a pin hinge and their opposite legs pivotally connected to the said arms whereby the incidence of the said wings are conversely changed by a limited movement of the said joy stick, governed by said pivotal looseness.

2. In a control apparatus for airplanes having a fuselage and a pair of oppositely pivoted wings adapted to function as ailerons and extending transversely to the said fuselage and a pair of shafts providing pivots for the said wings; levers fixed to the ends of the said shafts within the said fuselage and extending in substantially the same plane therewith, a joy stick mounted on an axle substantially parallel to the plane of the said levers, control arms rigidly fixed to the said axle and extending at right angles thereto and having their outer ends pivotally connected with the said arms, means comprising angle links having their legs loosely pivotally connected to the said levers and the said arms by pin hinges providing links therebetween whereby upon a lateral movement of the said joy stick the incidence of the said wings can be changed within fixed limits, governed by said pivotal looseness.

LILLIAN HOLDEN.
CASSELL DE HIBBS.